(12) United States Patent
Obst et al.

(10) Patent No.: US 11,881,802 B2
(45) Date of Patent: Jan. 23, 2024

(54) METHOD FOR DETECTING CONDENSATE FORMATION WHICH IS IMMINENT OR HAS ALREADY TAKEN PLACE ON/IN ELECTRIC MOTORS, AND METHOD FOR AVOIDING CORRESPONDING CONDENSATE FORMATION AND/OR FOR ELIMINATING/REDUCING CONDENSATE ON/IN ELECTRIC MOTORS

(71) Applicant: ZIEHL-ABEGG SE, Künzelsau (DE)

(72) Inventors: Raphael Simon Obst, Öhringen (DE); Bjoern Wenger, Schrozberg (DE); Matthias Carsten Kammerer, Kupferzell (DE); Xenia Ratke, Niedernhall (DE)

(73) Assignee: ZIEHL-ABEGG SE, Kunzelsau (DE)

( * ) Notice: Subject to any disclaimer, the term of this patent is extended or adjusted under 35 U.S.C. 154(b) by 0 days.

(21) Appl. No.: 17/284,692

(22) PCT Filed: Sep. 16, 2019

(86) PCT No.: PCT/DE2019/200109
§ 371 (c)(1),
(2) Date: Apr. 12, 2021

(87) PCT Pub. No.: WO2020/074048
PCT Pub. Date: Apr. 16, 2020

(65) Prior Publication Data
US 2021/0344296 A1 Nov. 4, 2021

(30) Foreign Application Priority Data

Oct. 11, 2018 (DE) .......................... 102018217429.6

(51) Int. Cl.
*H02P 29/032* (2016.01)
*H02P 29/62* (2016.01)
*G01N 25/66* (2006.01)

(52) U.S. Cl.
CPC ........... *H02P 29/032* (2016.02); *G01N 25/66* (2013.01); *H02P 29/62* (2016.02)

(58) Field of Classification Search
CPC ........ H02P 5/74; H02P 2101/25; H02J 7/0048
See application file for complete search history.

(56) References Cited

U.S. PATENT DOCUMENTS 7,312,593 B1   12/2007  Streicher
11,085,455 B1*  8/2021  Combs .................. F04D 27/006
(Continued)

FOREIGN PATENT DOCUMENTS

DE        10004188 A1    8/2001
DE    102016215440 A1    2/2018
(Continued)

OTHER PUBLICATIONS

Translation of JP2013170736 has been attached.*
(Continued)

*Primary Examiner* — Zoheb S Imtiaz
(74) *Attorney, Agent, or Firm* — FisherBroyles, LLP; Jason P. Mueller

(57) ABSTRACT

A method is used to identify impending or previously occurring condensation on/in electric motors, in particular on/in electric motors as a component of fans or fan groups. It includes the following method steps:
  Determining component temperatures, preferably surface temperatures on the electronics, on/in the motor, on/in the fan, or on/in fan groups;
  Determining the dew point temperature or individual dew point temperatures on the electronics, in/on the motor, fan, or on/in fan groups;
(Continued)

Figure 1:
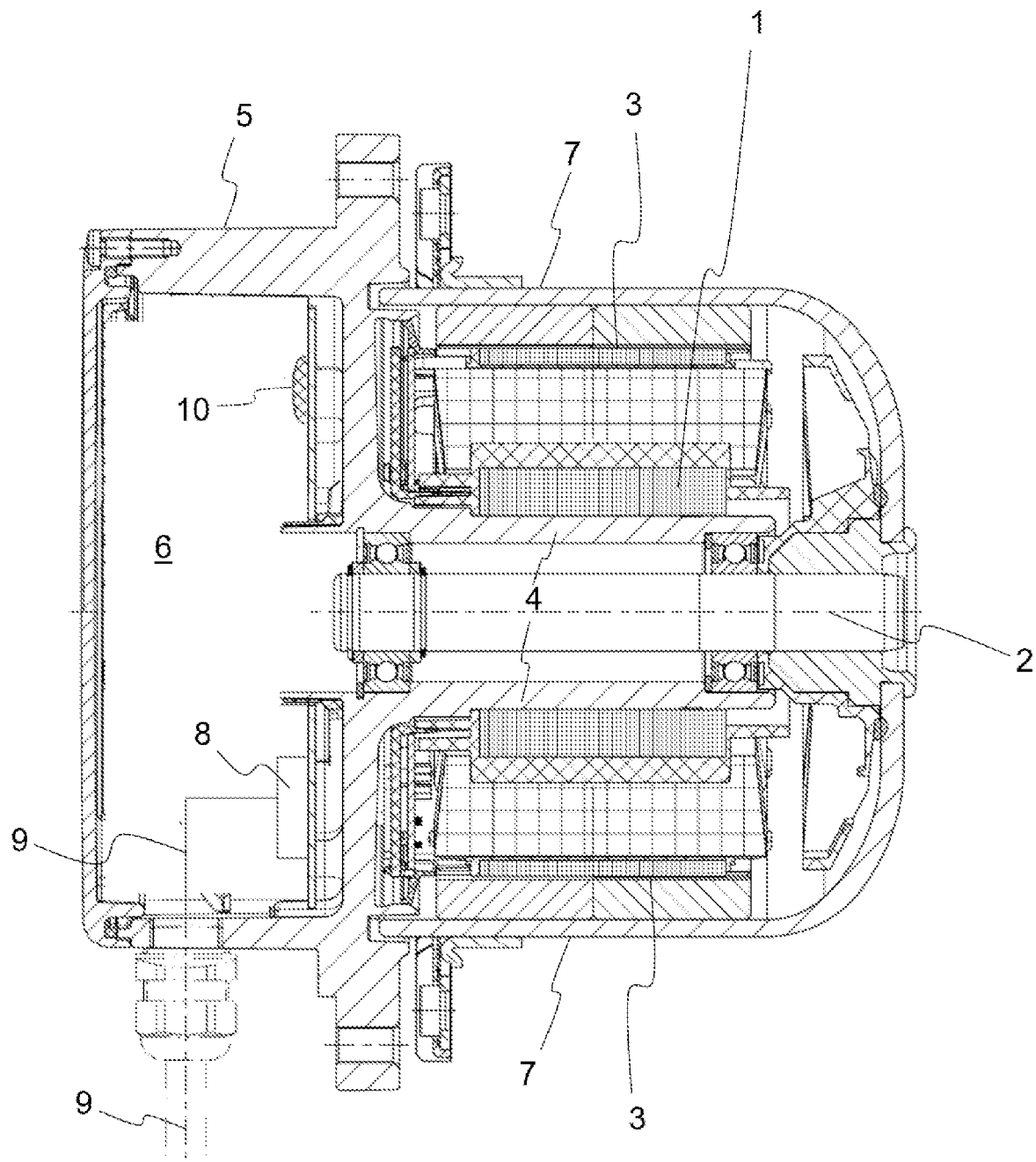

Comparing the respective component temperature with the respective dew point temperature and concluding a formation of condensation has already taken place or is imminent when the component temperature approaches the dew point temperature or when the dew point temperature is undershot. A further method serves to prevent the formation of condensate and/or to eliminate/remove condensate on/in electric motors, in particular on/in electric motors as a component of fans or fan groups. It includes the following method steps:

Detecting an impending and/or previously occurring formation of condensate on or in the motor; and Initiating measures to prevent the formation of condensate and/or to eliminate/remove the condensate by means of passive or active measures.

18 Claims, 2 Drawing Sheets

(56) References Cited

U.S. PATENT DOCUMENTS

| | | | |
|---|---|---|---|
| 2013/0177416 A1* | 7/2013 | Renschler | F03D 80/40 416/1 |
| 2014/0159634 A1* | 6/2014 | Yokoyama | H05K 7/20836 318/471 |
| 2016/0290675 A1* | 10/2016 | Hashino | F24F 11/63 |
| 2017/0077777 A1 | 3/2017 | Nam | |
| 2018/0059695 A1* | 3/2018 | Carignan | G05D 27/02 |
| 2018/0167018 A1* | 6/2018 | Shin | G01K 7/16 |

FOREIGN PATENT DOCUMENTS

| | | | |
|---|---|---|---|
| EP | 1959532 A1 | | 8/2008 |
| EP | 2615302 A1 | | 7/2013 |
| JP | S58151847 | | 9/1983 |
| JP | 2013170736 | * | 9/2013 |
| RU | 2223203 C1 | | 2/2004 |
| SU | 1115028 A1 | | 9/1984 |

OTHER PUBLICATIONS

Ilja Belov et al: "Application of CFD modelling for energy efficient humidity management of an electronics enclosure in storage under severe climatic conditions", Thermal, Mechanical and Multi-Physics Simulation and Experiments in Microelectronics and Micro-Systems, 2008. EUROSIME 2008. International Conference on, IEEE, Piscataway, NJ, USA, Apr. 20, 2008 (Apr. 20, 2008), pp. 1-8, XP031255074, ISBN: 978-1-4244-2127-5.

* cited by examiner

METHOD FOR DETECTING CONDENSATE FORMATION WHICH IS IMMINENT OR HAS ALREADY TAKEN PLACE ON/IN ELECTRIC MOTORS, AND METHOD FOR AVOIDING CORRESPONDING CONDENSATE FORMATION AND/OR FOR ELIMINATING/REDUCING CONDENSATE ON/IN ELECTRIC MOTORS

This patent application is a 35 U.S.C. § 371 national stage entry based on and claiming priority to International Application PCT/DE2019/200109, filed on Sep. 16, 2019, which in turn claims priority based on German Patent Application DE 10 2018 217 429.6, filed on Oct. 11, 2018, the disclosures of which are incorporated herein by reference in their entireties.

The disclosure relates to a method for detecting an impending or previously occurring formation of condensate on/in electric motors, in particular on/in electric motors as a component of fans or fan groups. Furthermore, the disclosure relates to a method for preventing the formation of condensate and/or for eliminating/removing condensate on/in electric motors, in particular on/in electric motors as a component of fans or fan groups.

First of all, it is essential that the claimed methods relate very generally to electric motors, in particular to EC motors (Electronically Commutated Motors), in which the motor electronics generate a system of feed signals, the system of feed signals being able to generate a rotating field in the electric motor, which causes the rotor to rotate. The EC motor can be installed in an internal rotor design or in an external rotor design. In this case, the motor electronics can be integrated into the motor but can also be arranged externally.

In special applications and/or under ambient conditions, condensate may form in or on the motor depending on the operation. In particularly unfavorable cases, this can lead to damage or failure of the motor. It has been shown that failure due to moisture is extremely difficult to verify, not least because of the gradual evaporation.

Protective functions for a wide variety of occasions are already known in practice, for example to prevent icing. To this end, an adjustable portion of the rated current is supplied to the stator winding as pulsed direct current.

With regard to the problems relating to air humidity and condensation, no useful approaches for detecting and eliminating the problem are known. This is not least due to the fact that the formation of condensate can take place in a wide variety of locations on or in the motor. Thus, it is extremely difficult to detect a pending or previously occurring formation of condensate and, before or immediately after the formation of condensate, to obtain a remedy to be able to exclude wide-ranging problems with reference to the motor, but also in relation to the fan comprising the motor or a corresponding fan assembly.

The preceding object is achieved as relates to the detection of a pending or previously occurring formation of condensate by means of the features described and claimed herein. With regard to the remedy, namely to prevent the formation of condensate and/or to eliminate or remove condensate on/in electric motors, the above object is achieved by means of the features described and claimed herein.

In one embodiment, the method comprises the following method steps:
Determining component temperatures, preferably surface temperatures on the electronics (internal/external), on/in the motor, on/in the fan, or on/in fan groups;
Determining the dew point temperature or individual dew point temperatures on the electronics, in/on the motor, fan, or on/in fan groups;
Comparing the respective component temperature to the respective dew point temperature and concluding a formation of condensate has already taken place or is imminent when the component temperature approaches the dew point temperature or when the dew point temperature is undershot.

With respect to the prevention of formation of condensate and/or the elimination/removal of condensate, the following additional method steps are provided.
Detecting an impending and/or previously occurring formation of condensate on or in the motor; and
Initiating measures to prevent the formation of condensate and/or to eliminate/remove the condensate by means of passive or active measures.

In order to implement the teaching according to the disclosure, it is essential that the formation of condensate is linked to physical conditions. Condensate forms wherever the component surface temperature falls below the dew point or the dew point temperature.

The process during which condensate develops is called condensation. This is the transition of a substance from the gaseous to the liquid physical state. Condensate is formed when a gas or gas mixture is over-saturated with regard to the condensing component.

The previously mentioned dew point or the dew point temperature is important for determining the point in time at which condensate develops. Ambient air is the temperature at which the air with a certain air humidity, under constant pressure, must be below so that water vapor separates out as dew or fog. The air humidity is 100% at the dew point. This is often referred to as air saturated with water vapor.

The dew point or the dew point temperature can be determined with a chilled mirror dew-point hygrometer or with other hygrometric methods. Alternatively, the determination is made indirectly via the measurement of air temperature and air humidity.

The relative humidity can be measured using a humidity sensor. The temperature of the air is regularly determined by means of a thermometer. The dew point temperature is calculated as follows:

$\varphi_{rel}$=relative air humidity as a percentage (measured by sensor)

T=air temperature (measured by sensor or otherwise determined)

Constants are defined as follows from the specific situation:

a=7.5 b=237.3° C.

Saturation vapor pressure=6.1078 hPa·10^((a·T)/(b+T))

Vapor pressure=$\varphi_{rel}$·saturation vapor pressure

V=$\log_{10}$(vapor pressure/6.1078)

Dew point temperature=(b·V)/(a−V)

The component temperature on the respective component can be evaluated on the basis of the above physical relationships. In a particularly advantageous manner, the component temperature is measured or determined and evaluated, in particular at critical locations, on or in the motor or on or in the fan.

It is conceivable and can be advantageous not to measure the component temperature, but rather to derive it from a calculation model of the motor, of the fan, or of the fan group. In a very especially advantageous manner, a digital twin of the motor/fan or the fan group can be used for this.

The digital twin is a digital image of a real, individual object in the case of the teaching of an electric motor, a fan, or a fan system according to the disclosure. The digital twin depicts the properties of the motor or fan using a calculation model and, if necessary, while incorporating known data from the motor or fan. The task of the digital twin is considered to be to calculate component states of the components of the motor or the fan with virtual sensors, as a function of the respective operating state. The component states determined on the basis of such a calculation are transmitted to the operating-parameter-specific algorithm, which determines/calculates operating parameters or operating states of the fan from the operating data of the digital twin. Based on the result, a situation-specific rule adjustment is possible. Operating parameters and operating states are equally relevant insofar as they are quantities which can be calculated.

The previously mentioned combination of digital twin and operating-parameter-specific algorithm can be implemented in the sense of a digital twin algorithm on a microprocessor to be assigned to the motor of the fan and thus assigned to the fan as a fixed component.

A digital twin algorithm is the combination of a digital twin describing the motor or fan with a type of intelligent algorithm that is configured for specific operating parameters.

With a correspondingly designed fan, predictive maintenance can be carried out with the goal of preventing a fan failure, for example due to moisture damage. The system parameters are adjusted to suit the situation in order to achieve the maximum possible service life of the fan.

Using a digital image of the motor or fan and algorithms specific to the operating parameters, the goal of predictive maintenance is to utilize the service life of the fan components as completely as possible and, at the same time, to prevent any failure of the fan. The service life of the fan can be calculated on the basis of calculated component states and the resulting operating parameters.

The digital twin uses physical and/or mathematical and/or statistical and/or empirical and/or combined models to calculate thermal and mechanical component states. This also includes mathematical as well as physical and non-physical models. The operating-parameter-specific algorithm (intelligent algorithm) requires the component states determined by the digital twin in order to determine any operating parameters, for example also to predict the fan failure.

In order to determine the surface temperature of a specific component, a temperature sensor would have to be positioned in the immediate vicinity of the specific component. This is often not possible due to financial, geometrical, and functional conditions of the fan/motor. Correspondingly, such component states, such as the temperature at a specific point, are calculated via the digital twin, in addition to an operating-parameter-specific algorithm. Surface temperatures can also be recorded using conventional sensors.

In one exemplary embodiment, the calculation is based on a mathematical model, which in turn is based on a reduced, coupled thermomagnetic calculation model. The combination of a digital twin together with an operating-parameter-specific algorithm calculates heat sources, heat sinks, and the thermal state of the overall system relating to the motor of the fan. Using the virtual sensors of the digital twin, the component temperature can be determined as a function of the operating state of the fan/motor and incorporated into the operating-parameter-specific algorithm as the operating state.

Both the digital twin, including its virtual sensors, and the operating-parameter-specific algorithm can be implemented on the existing microprocessor, whereby a certain amount of machine intelligence is incorporated into the motor or fan.

The previously mentioned method can relate to all conceivable operating parameters of the fan. The application of the method according to the disclosure always makes sense if the respective parameters cannot be measured directly, but the knowledge thereof, however, can be used to optimize the operation of the fan, in particular the temperature at specific locations or components of the motor or fan.

There are then several potential condensation locations for an electric motor or a fan or a fan assembly. Therefore, it is advisable to calculate or determine a dew point temperature for each of the potential condensation locations individually, namely in accordance with the above explanations.

In principle, it is conceivable to measure the dew point temperature using hygrometric methods. This is often not possible, not least for reasons of space and costs.

Alternatively, it is advantageous to determine the dew point temperature indirectly, namely from the actual vapor pressure, in which the temperature-dependent saturation vapor pressure and the ambient air humidity of the motor, the fan, or the fan group are incorporated into the calculation of the vapor pressure. In the context of a low-pressure/high-pressure application, pressure-related calculation rules and/or parameters can be considered in order to calculate the dew point temperature.

The ambient temperature of the motor or fan or fan group required for the calculation can be measured directly on-site using a temperature sensor. It is also conceivable that the ambient temperature of the motor or the fan or the fan group is determined via a decentralized measuring unit and transmitted to the calculation unit. An indirect determination of the ambient temperature of the motor or the fan or the fan group is also conceivable (for example using a calculation model). Of particular relevance is the determination of the air temperature that surrounds the surface at risk with respect to the formation of condensate.

The calculation unit is the microprocessor of the EC motor. It is also conceivable to perform the calculations outside the motor on a suitable device (PLC, gateway, PC, cloud, etc.).

The ambient air humidity (moisture content of the air surrounding the component, the motor, or the fan or the fan group) can be measured by means of a moisture sensor, the moisture sensor optionally being integrated into the motor or fan or into the fan group or being guided out of the motor, the fan, or the fan group. The values can also be transmitted from a decentralized measuring unit to the calculation unit.

The determination of the ambient temperature results in the temperature T as a relevant parameter. The determination of the ambient air humidity results in the relative air humidity $\varphi_{rel}$ as a further relevant parameter.

The dew point temperature is calculated in individual steps as follows:

a. Calculating the Saturation Vapor Pressure SDD

The saturation vapor pressure of a substance is the pressure at which the gaseous physical state is in equilibrium with the liquid physical state. This is temperature-dependent and is calculated approximately according to the Magnus formula:

$$SDD = 6{,}1078 \text{ hPa} \cdot 10^{\frac{7{,}5 \cdot T}{237{,}3°\ C. + T}}$$

This applies in the temperature range between −45° C. and +60° C. and covers the typical working environment of an EC motor.

b. Calculating the Actual Vapor Pressure DD

The actual vapor pressure is a measure of the absolute moisture content in the air. The relative air humidity $\varphi_{rel}$ indicates a percentage of how strongly the saturation vapor pressure is already saturated or reached.

$$DD = \varphi_{rel} \cdot SDD$$

c. Calculating the Dew Point Temperature τ

The dew point temperature is the temperature at which the actual vapor pressure corresponds to the saturation vapor pressure at which the relative humidity is 100%. If the surface temperature of a component is undershot and thus the adjacent fluid cools down to below the dew point temperature, this is over-saturated with regard to the water vapor content. As a result, the excess water vapor settles on the surface of the particular component in the form of condensate.

The dew point temperature τ is then approximately calculated as follows:

$$\tau = 237{,}3°\ C. \cdot \frac{\log_{10}\frac{DD}{6{,}1078 \text{ hPa}}}{7{,}5 - \log_{10}\left(\frac{DD}{6{,}1078 \text{ hPa}}\right)}$$

Since these are approximations, as is also the case with saturation vapor pressure, the formulas in the literature can also be found to have other numerical values, which, however, provide comparable results for the respective temperature range for which they are designed.

In the event that the application is a low-pressure/high-pressure application in which a pressure-related shift in the dew point is not negligible, pressure-related calculation rules or parameters must be incorporated. The ambient pressure, if it is approximately constant, must be stored as a fixed value in the microprocessor of the motor or determined dynamically using a pressure sensor.

Temperature monitoring of critical components at critical locations is an essential part of the method. Critical locations, in this case, can depend on the installation conditions, for example the installation position. The component temperatures can be monitored indirectly using a thermal model, optionally coupled with other models and calculation rules that enable an estimation of the surface temperatures. The determination of temperatures on surfaces is indirectly possible using a thermal model. Thus, temperatures or other physical variables of the motor are recorded.

When determining the relative humidity, a time factor can be used that takes into account the time delay until the air surrounding the motor corresponds to that at the actual measuring location with regard to the relative humidity. A corresponding calculation model is also conceivable in this case which takes into account influencing factors such as the motor speed, for example.

The method according to the disclosure to prevent the formation of condensate and/or to eliminate/remove condensate on/in electric motors, in particular on/in electric motors as a component of fans or fan groups, comprises the following method steps:

Detecting an impending and/or previously occurring formation of condensate on or in the motor; and Initiating measures to prevent the formation of condensate and/or to eliminate/remove the condensate by means of passive or active measures.

Consequently, protective mechanisms are implemented here, which can include different measures, for example ventilation/aeration using any ventilation effects by rotating the rotor of the motor. As an alternative or in addition, it is conceivable that the motor and thus the fan are started briefly, starting from a stationary motor. It is also conceivable that the measures include the adaptation of the motor speed when the motor is running. Other motor heating functions are also conceivable, according to which locally relevant power loss is triggered by targeted control of motor parts or components.

A further suitable measure is active heating, in which the heating can relate to the motor as a whole or to individual motor components, namely where there is a risk of the formation of condensate.

It is particularly advantageous if a warning message is generated and sent to a higher-level system before or when the aforementioned measures are initiated. A further advantage is the storage in an event memory/system memory, which can be accessed particularly in the event of complaints. The memory can be an internal or external event memory. It is also conceivable for the generated data to be transmitted, for example via a cloud, to a decentralized or central computer and memory.

Furthermore, it should be noted that it is of particular advantage if several or many dew point temperatures are determined at/on relevant locations/components across the motor or the fan, namely based on the potential condensation location in each case. Depending on the condensation location at risk, this allows the optimum mechanism to be selected from various protective mechanisms.

In a special embodiment, the evaporation rate is determined/calculated, which may specify the duration of the respective activity for the protective mechanism or the respective measure. Automatic operation using the method according to the disclosure is possible on the basis of such a scheduled measure.

Figure 2:
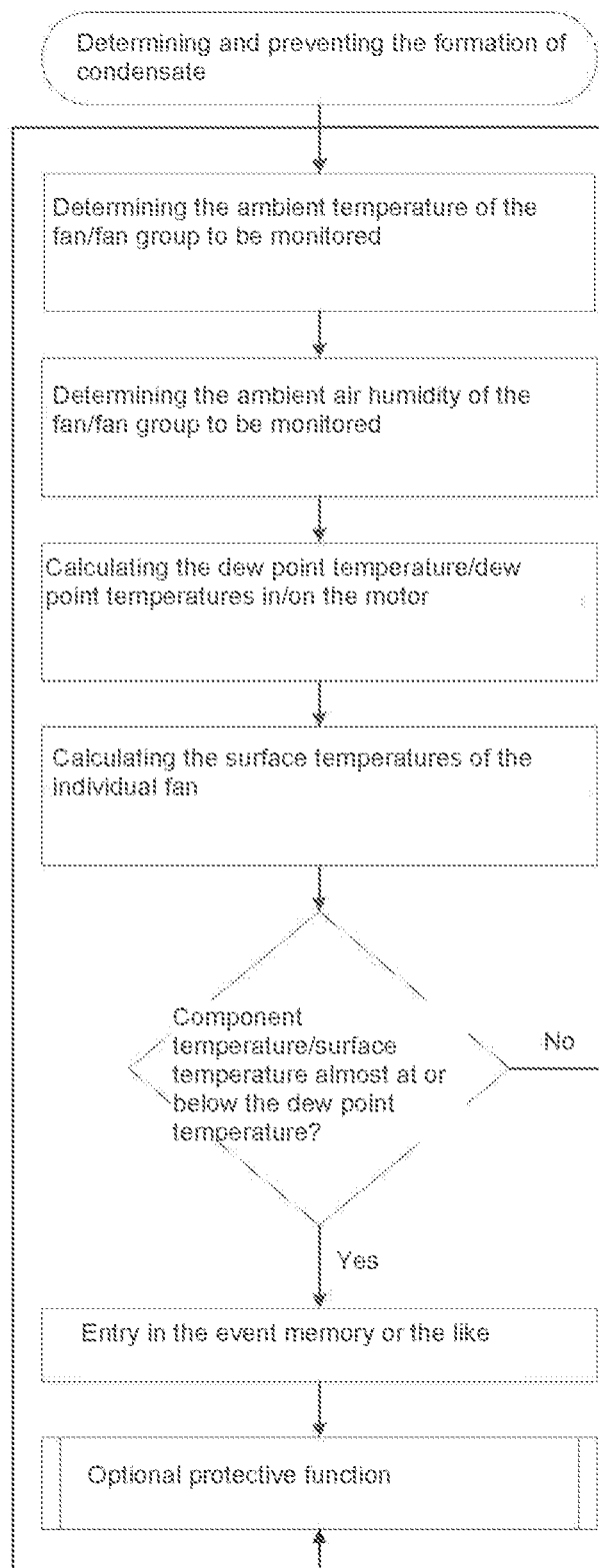

There are then various options for designing and refining the teaching of the present disclosure in an advantageous manner. To this end, reference is made, on the one hand, to the claims relating back to claim 1 and, on the other hand, to the subsequent explanation of a preferred exemplary embodiment of the disclosure by means of the drawing. In conjunction with the explanation of the preferred exemplary embodiment of the disclosure by means of the drawing, preferred embodiments and enhancements of the teaching are also generally explained. The drawings show the following:

FIG. 1 a schematic, sectional view of an exemplary embodiment of a motor, during the operation of which the method according to the disclosure can be used; and FIG. 2 a flowchart of the sequence of the method according to the disclosure with the individual method steps.

FIG. 1 shows, in a sectional drawing, a typical electric motor in an external rotor design, as it is used as a drive unit in fans/fan groups. The familiarity with such electric motors is assumed, so that a detailed explanation is not necessary at this juncture.

In the case of the electric motor with the external rotor design, it is essential that the stator 1 is arranged about the motor axis 2 and the rotor 3 is arranged about the stator 1, so as to rotate thereabout.

The stator 1 is positioned on a bearing tube 4 which, together with a side wall 5, is part of a housing 6, which can be divided into different regions inside.

The rotor 3 is surrounded by a wall 7, which rotates jointly with the rotor 3. This means that a fan impeller, which is not shown in FIG. 1, can be attached in a rotationally fixed manner using suitable means.

A microprocessor 8 is provided inside the housing 6, with a communication line 9 exiting from the microprocessor toward the outside of the housing 6.

Furthermore, a sensor 10, specifically a moisture sensor, is arranged inside the housing 6. It is also conceivable to provide a temperature sensor, which is not shown, within the housing 6.

The measurement data obtained via the sensor 10 are sent to the microprocessor 8 and can be supplied to external electronics or an evaluation unit via the communication line 9, as discussed in the general part of the description. Furthermore, measurement data from an external measurement unit can be transmitted to the motor via the communication line 9 (wired or wireless), so that these data are evaluated by the microprocessor 8. If an external evaluation unit is used to determine the risk of condensation, it is also the particular evaluation unit which initiates the protective mechanisms via the communication line 9. The data flow is primarily intended in the direction of the motor, according to which an external measurement is supplied to the motor, for example. It is conceivable to have the condensate detection and condensate prevention carried out, for example, by an external device (gateway, PLC, cloud, etc.).

FIG. 2 shows, within the scope of a flowchart, the sequence of the method according to the disclosure for detecting and preventing the formation of condensate.

In this case, the ambient temperature of the motor/fan to be monitored or a complete fan group is first measured or determined. According to the general description, a thermal model using a digital twin can be utilized.

The ambient air humidity of the motor/fan to be monitored (or a complete fan group) is determined. The dew point temperature or individual dew point temperatures are then calculated in critical areas or on critical components in or on the motor.

Surface temperatures of the individual components of the motor or fan are calculated or measured. If the component temperature or surface temperature is almost at the dew point temperature or below the dew point temperature, an entry can be made in an event memory, for example, and optional protective functions can be initiated. If this is not the case, a suitable protective function can be activated, almost automatically, to prevent the dew point from dropping to below the lower limit.

To avoid repetition, reference is otherwise made to the general description in which the method is discussed in detail.

With regard to other advantageous designs of the teaching according to the disclosure, reference is made, to avoid repetition, to the general part of the description and to the attached claims.

Finally, express reference is made regarding the fact that the previously described exemplary embodiment of the teaching according to the disclosure is only meant to explain the claimed teaching; however, it is not limited to this exemplary embodiment.

LIST OF REFERENCE NUMERALS

1 Stator
2 Motor axis
3 Rotor
4 Bearing tube
5 Wall (stator)
6 Housing
7 Wall (rotor)
8 Microprocessor
9 Communication line
10 Sensor, humidity sensor

The invention claimed is:

1. A method for detecting impending or previously occurring formation of condensate on or in an electric motor that is a component of a fan or fan group, the method comprising:
   determining a component surface temperature on or in the electric motor, the fan, or the fan group by deriving the component surface temperature using a digital twin of the motor, the fan or the fan group;
   determining a dew point temperature on or in the electric motor, the fan, or the fan group; and
   comparing the respective component surface temperature with the respective dew point temperature to determine whether or not a formation of condensation has already taken place or is imminent.

2. The method according to claim 1, wherein the component surface temperature is determined on the respective electronic component.

3. The method according to claim 1, wherein the component surface temperature is determined at one or more critical locations.

4. The method according to claim 1, wherein the component surface temperature is determined from a digital image of the electric motor, the fan, the fan group, or the electronic component.

5. The method according to claim 1, wherein the dew point temperature is determined locally at potential condensation locations.

6. The method according to claim 1, wherein the dew point temperature is measured by means of hygrometric methods.

7. The method according to claim 1, wherein the dew point temperature is determined from an actual vapor pressure, and the actual vapor pressure is determined from a temperature-dependent local saturation vapor pressure and a local ambient air humidity of the electric motor, the fan, the fan group, or the electronic component.

8. The method according to claim 1, wherein the determining of the dew point temperature comprises applying pressure-related calculation rules for a low-pressure/high-pressure application.

9. The method according to claim 7, further comprising transmitting the component surface temperature from an internal or decentralized measuring unit to an evaluation unit.

10. The method according to claim 7, wherein the ambient air humidity is measured using a moisture sensor.

11. The method according to claim 7, wherein a time factor or a calculation model is used to determine the ambient air humidity.

12. A method for removing and preventing condensate from forming on an electric motor, the method comprising:
   detecting an impending and/or previously occurring formation of condensate on or in the electric motor according to the method of claim 1; and
   initiating measures to remove and prevent the formation of condensate by means of passive or active measures.

13. The method according to claim 12, wherein the measures include ventilation and aeration by rotating a rotor in the electric motor.

14. The method according to claim 12, wherein the measures include starting the fan.

15. The method according to claim 12, wherein the measures include adjusting a motor speed.

16. The method according to claim 12, wherein the measures include heating the electric motor, a motor component, or external electronics.

17. The method according to claim 12, further comprising:
   generating a warning message before or upon initiating the measures.

18. The method according to claim 12, further comprising:
   storing a detection of a completed or impending formation of condensate and/or initiated measures in an internal or external event memory.

\* \* \* \* \*